United States Patent
Xue et al.

(10) Patent No.: US 7,094,830 B2
(45) Date of Patent: Aug. 22, 2006

(54) METHOD FOR PRODUCING AN AQUEOUS DISPERSION OF PARTICLES COMPOSED OF A POLYMER AND A FINE-PARTICLE INORGANIC SOLID

(75) Inventors: Zhijian Xue, Ludwigshafen (DE); Harm Wiese, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 283 days.

(21) Appl. No.: 10/480,636

(22) PCT Filed: Jun. 14, 2002

(86) PCT No.: PCT/EP02/06545

§ 371 (c)(1),
(2), (4) Date: Dec. 22, 2003

(87) PCT Pub. No.: WO03/000760

PCT Pub. Date: Jan. 3, 2003

(65) Prior Publication Data
US 2004/0171728 A1    Sep. 2, 2004

(30) Foreign Application Priority Data
Jun. 21, 2001    (EP) .................................. 10129537

(51) Int. Cl.
*C08K 3/22*    (2006.01)
(52) U.S. Cl. .................... 524/779; 524/783; 524/785; 524/789; 524/420; 524/425; 524/431; 524/493; 523/333; 523/205; 523/210
(58) Field of Classification Search ................ 524/420, 524/425, 431, 437, 493, 497, 779, 783, 785, 524/789; 523/333, 205, 210
See application file for complete search history.

(56) References Cited

U.S. PATENT DOCUMENTS

| 3,544,500 | A | 12/1970 | Osmond et al. |
| 4,421,660 | A | 12/1983 | Solc nee Hajna |
| 4,608,401 | A | 8/1986 | Martin |
| 4,981,882 | A | 1/1991 | Smith et al. |
| 6,309,787 | B1 * | 10/2001 | Cheng .................... 430/137.14 |
| 6,635,693 | B1 * | 10/2003 | Wang et al. ................. 523/211 |
| 6,833,401 | B1 * | 12/2004 | Xue et al. ................... 524/401 |
| 2004/0156994 | A1 * | 8/2004 | Wiese et al. ............. 427/372.2 |

FOREIGN PATENT DOCUMENTS

| EP | 0 104 498 | 4/1984 |
| EP | 0 505 230 | 9/1992 |
| EP | 0 572 128 | 12/1993 |
| GB | 2 227 739 | 8/1990 |
| WO | 01 18081 | 3/2001 |
| WO | 01 29106 | 4/2001 |
| WO | WO 200129106 A1 * | 4/2001 |

OTHER PUBLICATIONS

L. Mascia: "Development in organic-inorganic polymeric hybrids: ceramers" Trends in Polymer Science, vol. 3, No. 2, pp. 61-66 Feb. 1995.
Journal of Colloid and Interface Science, vol. 109, pp. 69-76 1986.
Polymer, vol. 30, pp. 254-258 1989.
Angewandte Makromolekulare Chemie, vol. 189, pp. 23-24 1991.
Tianjin Daxue Xuebao, vol. 4, pp. 10-15 1991.
Angewandte Makromomolekulare Chemie, vol. 242, pp. 105-122 1996.
Synthesis Studies of Paramagnetic Polystyrene Latex Particles in Scientific and Clinical Applications of Magnetic Carriers, pp. 69-76, 1997.
Advanced Materials, vol. 11, No. 5, pp. 408-410 (1999).

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

A process for preparing an aqueous dispersion of composite particles composed of addition polymer and finely divided inorganic solid is described.

17 Claims, No Drawings

METHOD FOR PRODUCING AN AQUEOUS DISPERSION OF PARTICLES COMPOSED OF A POLYMER AND A FINE-PARTICLE INORGANIC SOLID

BACKGROUND OF THE INVENTION

1. Field of the Invention

The present invention relates to a process for preparing an aqueous dispersion of particles composed of addition polymer and finely divided inorganic solid (composite particles), in which process a mixture of ethylenically unsaturated monomers is dispersely distributed in aqueous medium and is polymerized by the method of free-radical aqueous emulsion polymerization by means of at least one free-radical polymerization initiator in the presence of at least one dispersely distributed, finely divided inorganic solid and at least one anionic, cationic and nonionic dispersant. The present invention further relates to the use of the aqueous dispersion of composite particles and to the composite-particle powders obtainable therefrom.

2. Description of the Background

Aqueous dispersions of composite particles are general knowledge. They are fluid systems whose disperse phase in the aqueous dispersion medium comprises polymer coils consisting of a plurality of intertwined polymer chains—known as the polymer matrix—and particles composed of finely divided inorganic solid, which are in disperse distribution. The diameter of the composite particles is frequently within the range from 30 to 5000 nm.

Like polymer solutions when the solvent is evaporated and aqueous polymer dispersions when the aqueous dispersion medium is evaporated, aqueous dispersions of composite particles have the potential to form modified polymer films containing finely divided inorganic solid, and on account of this potential they are of particular interest as modified binders—for example, for paints or for compositions for coating leather, paper or plastics films. The composite-particle powders obtainable in principle from aqueous dispersions of composite particles are, furthermore, of interest as additives for plastics, as components for toner formulations, or as additives in electrophotographic applications.

The preparation of aqueous dispersions of composite particles is based on the following prior art.

A process for preparing polymer-enveloped inorganic particles by means of aqueous emulsion polymerization is disclosed in U.S. Pat. No. 3,544,500. In this process the inorganic particles are coated with water-insoluble polymers before the actual aqueous emulsion polymerization. The inorganic particles thus treated in a complex process are dispersed in an aqueous medium using special stabilizers.

EP-A 104 498 relates to a process for preparing polymer-enveloped solids. A characteristic of the process is that finely divided solids having a minimal surface charge are dispersed in the aqueous polymerization medium by means of a nonionic protective colloid and the ethylenically unsaturated monomers added are polymerized by means of nonionic polymerization initiators.

U.S. Pat. No. 4,421,660 discloses a process for preparing aqueous dispersions whose disperse particles feature inorganic particles surrounded completely by a polymer shell. The aqueous dispersions are prepared by free-radically initiated aqueous emulsion polymerization of hydrophobic, ethylenically unsaturated monomers in the presence of inorganic particles in disperse distribution.

A process for polymerizing ethylenically unsaturated monomers in the presence of uncharged inorganic solid particles stabilized in the aqueous reaction medium using nonionic dispersants is disclosed in U.S. Pat. No. 4,608,401.

The free-radically initiated aqueous emulsion polymerization of styrene in the presence of modified silicon dioxide particles is described by Furusawa et al. in Journal of Colloid and Interface Science 109 (1986) 69 to 76. The spherical silicon dioxide particles, having an average diameter of 190 nm, are modified using hydroxypropylcellulose.

Hergeth et al. (see Polymer 30 (1989) 254 to 258) describe the free-radically initiated aqueous emulsion polymerization of methyl methacrylate and, respectively, vinyl acetate in the presence of aggregated, finely divided quartz powder. The particle sizes of the aggregated quartz powder used are between 1 and 35 µm.

GB-A 2 227 739 relates to a special emulsion polymerization process in which ethylenically unsaturated monomers are polymerized using ultrasound waves in the presence of dispersed inorganic powders which have cationic charges. The cationic charges of the dispersed solid particles are generated by treating the particles with cationic agents, preference being given to aluminum salts. The document, however, gives no details of particle sizes and stability of the aqueous dispersions of solids.

EP-A 505 230 discloses the free-radical aqueous emulsion polymerization of ethylenically unsaturated monomers in the presence of surface-modified silicon dioxide particles. They are functionalized using special acrylic esters containing silanol groups.

U.S. Pat. No. 4,981,882 relates to the preparation of composite particles by means of a special emulsion polymerization process. Essential features of the process are finely divided inorganic particles dispersed in the aqueous medium by means of basic dispersants; the treatment of these inorganic particles with ethylenically unsaturated carboxylic acids; and the addition of at least one amphiphilic component for the purpose of stabilizing the dispersion of solids during the emulsion polymerization. The finely divided inorganic particles preferably have a size of between 100 and 700 nm.

Haga et al. (cf. Angewandte Makromolekulare Chemie 189 (1991) 23 to 34) describe the influence of the nature and concentration of the monomers, the nature and concentration of the polymerization initiator, and the pH on the formation of polymers on particles of titanium dioxide dispersed in an aqueous medium. High encapsulation yields of the titanium dioxide particles are obtained if the polymer chains and the titanium dioxide particles have opposite charges. However, the publication contains no information on the particle size and the stability of the titanium dioxide dispersions.

In Tianjin Daxue Xuebao 4 (1991) 10 to 15, Long et al. describe the dispersant-free polymerization of methyl methacrylate in the presence of finely divided particles of silicon dioxide and, respectively, of aluminum oxide. High encapsulation yields of the inorganic particles are obtained if the end groups of the polymer chains and the inorganic particles have opposite charges.

EP-A 572 128 relates to a preparation process for composite particles in which the inorganic particles are treated with an organic polyacid or a salt thereof at a defined pH in an aqueous medium, and the subsequent free-radically initiated aqueous emulsion polymerization of ethylenically unsaturated monomers takes place at a pH<9.

Bourgeat-Lami et al. (cf. Angewandte Makromolekulare Chemie 242 (1996) 105 to 122) describe the reaction products obtainable by free-radical aqueous emulsion polymerization of ethyl acrylate in the presence of functionalized and unfunctionalized silicon dioxide particles. The polymerization experiments were generally carried out using anionically charged silicon dioxide particles, the nonionic nonylphenol ethoxylate NP30 and the anionic sodium dodecyl sulfate (SDS) as emulsifiers, and potassium peroxodisulfate as free-radical polymerization initiator. The authors describe the resulting reaction products as aggregates containing more than one silicon dioxide particle or as polymer clusters which form on the silicon dioxide surface.

Paulke et al. (cf. Synthesis Studies of Paramagnetic Polystyrene Latex Particles in Scientific and Clinical Applications of Magnetic Carriers, pages 69 to 76, Plenum Press, New York, 1997) describe three fundamental synthesis routes for preparing aqueous polymer dispersions containing iron oxide. Because of the deficient stability of the aqueous dispersion of solids, the use of freshly precipitated iron(II/III) oxide hydrate is an unavoidable precondition for all of the synthesis routes. In the first synthesis route, in the presence of this freshly precipitated iron(II/III) oxide hydrate, the free-radically initiated aqueous emulsion polymerization of styrene takes place with SDS as emulsifier and potassium peroxodisulfate as polymerization initiator. In the authors— favored second synthesis route, styrene and methacrylic acid are polymerized in the presence of the freshly precipitated iron(II/III) oxide hydrate, the emulsifier N-cetyl-N-trimethylammonium bromide (CTAB), and special surface-active polymerization initiators (PEGA 600) in methanolic/aqueous medium. The third synthesis route uses ethanol and methoxyethanol as polymerization medium, hydroxypropylcellulose as emulsifier, benzoyl peroxide as polymerization initiator, and a special iron(II/III) oxide/styrene mixture in order to prepare polymer dispersions containing iron oxide.

Armes et al. (cf. Advanced Materials 11 (5) (1999) 408 to 410) describe the preparation of silicon dioxide composite particles which are obtainable in an emulsifier-free, free-radically initiated aqueous emulsion polymerization at a pH of 10 with special olefinically unsaturated monomers in the presence of dispersed silicon dioxide particles. Postulated as a precondition for the formation of polymer particles containing silicon dioxide is a strong acid/base interaction between the polymer formed and the acidic silicon dioxide particles used. Polymer particles containing silicon dioxide were obtained with poly-4-vinylpyridine and copolymers of styrene and, respectively, methyl methacrylate with 4-vinylpyridine. As the smallest possible content of 4-vinylpyridine in methyl methacrylate and/or styrene monomer mixtures which were capable of forming composite particles comprising silicon dioxide, from 4 to 10 mol % were stated.

In the German patent application bearing the file reference 19942777.1, unpublished at the priority date of the present specification, a process for preparing aqueous composite-particle dispersions is described wherein the dispersed inorganic solid particles and the radical-generating and/or dispersing components used in the free-radically initiated aqueous emulsion polymerization have opposite charges.

In the German patent application bearing the file reference 10000281.1, likewise unpublished at the priority date of the present specification, the same applicant describes a process for preparing aqueous composite-particle dispersions wherein the dispersed inorganic solid particles have a nonzero electrophoretic mobility and wherein specific copolymers are used for the aqueous emulsion polymerization.

SUMMARY OF THE INVENTION

It is an object of the present invention to provide a new process for preparing an aqueous dispersion of composite particles by the method of free-radically initiated aqueous emulsion polymerization in the presence of a finely divided inorganic solid, said process being susceptible of broad application and furnishing composite particles having a balanced profile of good performance properties.

We have found that this object is achieved by a process for preparing an aqueous dispersion of composite particles composed of addition polymer and finely divided inorganic solid, in which process at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one anionic, cationic and nonionic dispersant, wherein
a) a stable aqueous dispersion of said at least one inorganic solid is used, said dispersion having the characteristic features that at an initial solids concentration of $\geqq 1\%$ by weight, based on the aqueous dispersion of said at least one inorganic solid, it still contains in dispersed form one hour after its preparation more than 90% by weight of the originally dispersed solid and its dispersed solid particles have a diameter $\leqq 100$ nm,
b) the dispersed particles of said at least one inorganic solid exhibit a nonzero electrophoretic mobility in an aqueous standard potassium chloride solution at a pH which corresponds to the pH of the aqueous reaction medium before the beginning of dispersant addition,
c) at least one anionic, cationic or nonionic dispersant is added to the aqueous solid-particle dispersion before the beginning of the addition of said at least one ethylenically unsaturated monomer,
d) then from 0.01 to 30% by weight of the total amount of said at least one monomer are added to the aqueous solid-particle dispersion and polymerized to a conversion of at least 90%, and
e) thereafter the remainder of said at least one monomer is added under polymerization conditions at the rate at which it is consumed.

DETAILED DESCRIPTION OF THE PREFERRED EMBODIMENTS

Finely divided inorganic solids suitable for the process of the invention are all those which form stable aqueous dispersions which at an initial solids concentration of $\geqq 1\%$ by weight, based on the aqueous dispersion of said at least one inorganic solid, still contain in dispersed form one hour after their preparation without stirring or shaking more than 90% by weight of the originally dispersed solid and whose dispersed solid particles have a diameter $\leqq 100$ nm and which, furthermore, exhibit a nonzero electrophoretic mobility at a pH which corresponds to the pH of the aqueous reaction medium before the beginning of dispersant addition.

The quantitative determination of the initial solids concentration and the solids concentration after one hour, and the determination of the particle diameters, take place by the method of analytical ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175). The particle diameters stated are those known as $d_{50}$ values.

Suitable finely divided inorganic solids which can be used in accordance with the invention include metals, metal compounds, such as metal oxides and metal salts, and also semimetal compounds and nonmetal compounds. Finely divided metal powders which can be used are noble metal colloids, such as palladium, silver, ruthenium, platinum, gold and rhodium, for example, and their alloys. Examples that may be mentioned of finely divided metal oxides include titanium dioxide (commercially available, for example, as Hombitec® grades from Sachtleben Chemie GmbH), zirconium(IV) oxide, tin(II) oxide, tin(IV) oxide (commercially available, for example, as Nyacol® SN grades from Akzo-Nobel), aluminum oxide (commercially available, for example, as Nyacol® AL grades from Akzo-Nobel), barium oxide, magnesium oxide, various iron oxides, such as iron(II) oxide (wustite), iron(III) oxide (hematite) and iron(II/III) oxide (magnetite), chromium(III) oxide, antimony(III) oxide, bismuth(III) oxide, zinc oxide (commercially available, for example, as Sachtotec® grades from Sachtleben Chemie GmbH), nickel(II) oxide, nickel (III) oxide, cobalt(II) oxide, cobalt(III) oxide, copper(II) oxide, yttrium(III) oxide (commercially available, for example, as Nyacol® YTTRIA grades from Akzo-Nobel), cerium(IV) oxide (commercially available, for example, as Nyacol® CEO2 grades from Akzo-Nobel), amorphous and/or in their different crystal modifications, and also their hydroxy oxides, such as, for example, hydroxytitanium(IV) oxide, hydroxyzirconium(IV) oxide, hydroxyaluminum oxide (commercially available, for example, as Disperal® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium (III) sulfide, titanium(IV) sulfide, zirconium(IV) sulfide, antimony(III) sulfide, and bismuth(III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin (III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxyapatite [$Ca_5\{(PO_4)_3OH\}$], orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, Optigel® SH (trademark of Südchemie AG), Saponit® SKS-20 and Hektorit® SKS 21 (trademarks of Hoechst AG), and Laponite® RD and Laponite® GS (trademarks of Laporte Industries Ltd.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron (II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate, and zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Degussa AG), Levasil® (trademark of Bayer AG), Ludox® (trademark of DuPont), Nyacol® and Bindzil® (trademarks of Akzo-Nobel) and Snowtex® (trademark of Nissan Chemical Industries, Ltd.). Nonmetal compounds suitable in accordance with the invention are, for example, colloidal graphite and diamond.

Particularly suitable finely divided inorganic solids are those whose solubility in water at 20° C. and 1 bar (absolute) is $\leq 1$ g/l, preferably $\leq 0.1$ g/l and, in particular, $\leq 0.01$ g/l. Particular preference is given to compounds selected from the group consisting of silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, iron(II) oxide, iron(III) oxide, iron(II/III) oxide, titanium dioxide, hydroxyapatite, zinc oxide, and zinc sulfide. Particular preference is given to silicon dioxide sols which have an electrophoretic mobility having a negative sign.

In the process of the invention it is also possible to use with advantage the commercially available compounds of the Aerosil®, Levasil®, Ludox®, Nyacol® and Bindzil® grades (silicon dioxide), Disperal® grades (hydroxyaluminum oxide), Nyacol® AL grades (aluminum oxide), Hombitec® grades (titanium dioxide), Nyacol® SN grades (tin (IV) oxide), Nyacol® YTTRIA grades (yttrium(III) oxide), Nyacol® CEO2 grades (cerium(IV) oxide) and Sachtotec® grades (zinc oxide).

The finely divided inorganic solids which can be used in the process of the invention have particles which, dispersed in the aqueous reaction medium, have a particle diameter of $\leq 100$ nm. Finely divided inorganic solids used successfully are those whose dispersed particles have a diameter >0 nm but $\leq 90$ nm, $\leq 80$ nm, $\leq 70$ nm, $\leq 60$ nm, $\leq 50$ nm, $\leq 40$ nm, $\leq 30$ nm, $\leq 20$ nm or $\leq 10$ nm and all values in between. With advantage, finely divided inorganic solids are used which have a particle diameter $\leq 50$ nm. The particle diameters are determined by the AUC method.

The obtainability of finely divided solids is known in principle to the skilled worker and they are obtained, for example, by precipitation reactions or chemical reactions in the gas phase (cf. E. Matijevic, Chem. Mater. 5 (1993) 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994, and R. J. Hunter in Foundations of Colloid Science, Vol. I, pages. 10 to 17, Clarendon Press, Oxford, 1991).

The stable dispersion of solids is often prepared directly during synthesis of the finely divided inorganic solids in aqueous medium or else by dispersing the finely divided inorganic solid into the aqueous medium. Depending on the way in which said solids are prepared, this is done either directly, in the case, for example, of precipitated or pyrogenic silicon dioxide, aluminum oxide, etc., or by using appropriate auxiliary devices, such as dispersers or ultrasound sonotrodes, for example.

In accordance with the invention, however, suitable finely divided inorganic solids are only those whose aqueous solids dispersion, at an initial solids concentration of $\geq 1\%$ by weight, based on the aqueous dispersion of said solid, still contains in dispersed form one hour after its preparation or by stirring or shaking up the sedimented solids, without further stirring or shaking, more than 90% by weight of the originally dispersed solid and whose dispersed solid particles have a diameter $\leq 100$ mm. Initial solids concentrations $\leq 60\%$ by weight are customary. With advantage, however, it is also possible to use initial solids concentrations $\leq 55\%$ by weight, $\leq 50\%$ by weight, $\leq 45\%$ by weight, $\leq 40\%$ by weight, $\leq 35\%$ by weight, $\leq 30\%$ by weight, $\leq 25\%$ by weight, $\leq 20\%$ by weight, $\leq 15\%$ by weight, $\leq 10\%$ by weight and $\geq 2\%$ by weight, $\geq 3\%$ by weight, $\geq 4\%$ by weight or $\geq 5\%$ by weight, based in each case on the aqueous dispersion of the finely divided inorganic solid, and all values in between. Per 100 parts by weight of said at least one ethylenically unsaturated monomer, use is made inventively of from 1 to 1000, generally from 5 to 300, and often from 10 to 200 parts by weight of said at least one finely divided inorganic solid.

An essential feature of the invention is that the dispersed solid particles exhibit a nonzero electrophoretic mobility in an aqueous standard potassium chloride solution at a pH which corresponds to the pH of the aqueous reaction medium before the beginning of dispersant addition. The pH is measured at 20° C. and 1 bar (absolute) using customary commercial pH meters on an aqueous dispersion containing here the at least one finely divided inorganic solid appropriate, besides acids and bases for adjusting the pH.

The method of determining the electrophoretic mobility is known to the skilled worker (cf., e.g., R. J. Hunter, Introduction to Modern Colloid Science, Section 8.4, pages 241 to 248, Oxford University Press, Oxford, 1993, and K. Oka and K. Furusawa in Electrical Phenomena at Interfaces, Surfactant Science Series, Vol. 76, Chapter 8, pages 151 to 232, Marcel Dekker, New York, 1998). The electrophoretic mobility of the solid particles dispersed in the aqueous reaction medium is measured using a commercial electrophoresis instrument, an example being the Zetasizer 3000 from Malvern Instruments Ltd., at 20° C. and 1 bar (absolute). For this purpose the aqueous dispersion of solid particles is diluted with a pH-neutral 10 millimolar (mM) aqueous potassium chloride solution (standard potassium chloride solution) until the concentration of solid particles is from about 50 to 100 mg/l. The adjustment of the sample to the pH possessed by the aqueous reaction medium before the beginning of dispersant addition is carried out using the customary inorganic acids, such as dilute hydrochloric acid or nitric acid, for example, or bases, such as dilute sodium hydroxide solution or potassium hydroxide solution, for example. The migration of the dispersed solid particles in the electrical field is detected by means of what is known as electrophoretic light scattering (cf., e.g., B. R. Ware and W. H. Flygare, Chem. Phys. Lett. 12 (1971) 81 to 85). In this method the sign of the electrophoretic mobility is defined by the migrational direction of the dispersed solid particles; in other words, if the dispersed solid particles migrate to the cathode, their electrophoretic mobility is positive, while if they migrate to the anode it is negative.

A suitable parameter for influencing or adjusting the electrophoretic mobility of dispersed solid particles to a certain extent is the pH of the aqueous reaction medium. Protonation and, respectively, deprotonation of the dispersed solid particles alter the electrophoretic mobility positively in the acidic pH range (pH<7) and negatively in the alkaline range (pH>7). A pH range suitable for the process of the invention is that within which a free-radically initiated aqueous emulsion polymerization can be carried out. This pH range is generally from 1 to 12, frequently from 1.5 to 11, and often from 2 to 10.

The pH of the aqueous reaction medium may be adjusted using commercially customary acids, such as dilute hydrochloric, nitric or sulfuric acid, or bases, such as dilute sodium hydroxide or potassium hydroxide solution, for example. It is often advantageous to add some or all of the quantity of acid or base used for pH adjustment to the aqueous reaction medium before said at least one finely divided inorganic solid is added.

It is of advantage if under the abovementioned pH conditions when the dispersed solid particles have an electrophoretic mobility having a negative sign, per 100 parts by weight of said at least one ethylenically unsaturated monomer, from 0.01 to 10 parts by weight, preferably from 0.05 to 5 parts by weight, and with particular preference from 0.1 to 3 parts by weight, of at least one cationic dispersant, from 0.01 to 100 parts by weight, preferably from 0.05 to 50 parts by weight, and with particular preference from 0.1 to 20 parts by weight, of at least one nonionic dispersant, and at least one anionic dispersant are used, the amount thereof being such that the equivalent ratio of anionic to cationic dispersant is more than 1, or when the dispersed solid particles have an electrophoretic mobility having a positive sign, per 100 parts by weight of said at least one ethylenically unsaturted monomer, from 0.01 to 10 parts by weight, preferably from 0.05 to 5 parts by weight, and with particular preference from 0.1 to 3 parts by weight, of at least one anionic dispersant, from 0.01 to 100 parts by weight, preferably from 0.05 to 50 parts by weight, and with particular preference from 0.1 to 20 parts by weight, of at least one nonionic dispersant, and at least one cationic dispersant are used, the amount thereof being such that the equivalent ratio of cationic to anionic dispersant is more than 1.

For the purposes of the present process, dispersants used are those which maintain not only the finely divided inorganic solid particles but also the monomer droplets and the resulting composite particles in disperse distribution in the aqueous phase and so ensure the stability of the aqueous dispersion of composite particles that is produced. Suitable dispersants include both the protective colloids commonly used to carry out free-radical aqueous emulsion polymerizations, and emulsifiers.

An exhaustive description of further suitable protective colloids is given in Houben-weyl, Methoden der organischen Chemie, Volume XIV/1, Makromolekulare Stoffe [Macromolecular substances], Georg-Thieme-Verlag, Stuttgart, 1961, pages 411 to 420.

Examples of suitable neutral protective colloids are polyvinyl alcohols, polyalkylene glycols, cellulose derivatives, starch derivatives and gelatin derivatives.

Suitable anionic protective colloids, i.e., protective colloids whose dispersive component has at least one negative electrical charge, are for example polyacrylic acids and polymethacrylic acids and their alkali metal salts, copolymers containing acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene.

Suitable cationic protective colloids, i.e., protective colloids whose dispersive component has at least one positive electrical charge, are, for example, the N-protonated and/or N-alkylated derivatives of homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides.

It is of of course also possible to use mixtures of emulsifiers and/or protective colloids. As dispersants it is common to use exclusively emulsifiers, whose relative molecular weights, unlike those of the protective colloids, are usually below 1000. Where mixtures of surface-active substances are used the individual components must of course be compatible with one another, which in case of doubt can be checked by means of a few preliminary experiments. An overview of suitable emulsifiers is given in Houben-Weyl, Methoden der organischen Chemie, Volume XIV/1, Makromolekulare Stoffe [Macromolecular substances], Georg-Thieme-Verlag, Stuttgart, 1961, pages 192 to 208.

Customary nonionic emulsifiers are for example ethoxylated mono-, di- and tri-alkylphenols (EO units: 3 to 50, alkyl: $C_4$ to $C_{12}$) and ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11), and the Lutensol® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the formula I

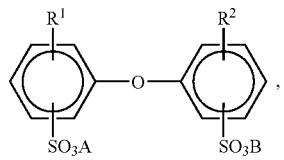

in which $R^1$ and $R^2$ are hydrogens or $C_4$ to $C_{24}$ alkyl but are not both simultaneously hydrogens and A and B can be alkali metal ions and/or ammonium ions. In the formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. A and B are preferably sodium, potassium or ammonium, particular preference being given to sodium. Particularly advantageous compounds I are those in which A and B are sodium, $R^1$ is a branched alkyl radical of 12 carbons, and $R^2$ is a hydrogen or $R^1$. Frequently, use is made of technical-grade mixtures containing a fraction of from 50 to 90% by weight of the monoalkylated product; for example, Dowfax® 2A1 (trademark of Dow Chemical Company). The compounds I are widely known, from U.S. Pat. No. 4,269,749, for example, and are obtainable commercially.

Suitable cation-active emulsifiers are generally $C_6$–$C_{18}$ alkyl-, aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the various paraffinic acid trimethylammonium ethyl esters, N-cetylpyridinium chloride, N-laurylpyridinium sulfate, and also N-cetyltrimethylammonium bromide, N-dodecyltrimethylammonium bromide, N-octyltrimethylammonium bromide, N-distearyldimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

For the purposes of this specification, the equivalent ratio of anionic to cationic dispersant means the number of moles of the anionic dispersant used multiplied by the number of anionic groups present per mole of the anionic dispersant, divided by the number of moles of the cationic dispersant used multiplied by the number of the cationic groups present per mole of the cationic dispersant. The equivalent ratio of cationic to anionic dispersant is defined accordingly.

The total amount of said at least one anionic, cationic and nonionic dispersant used in the process may be included in the initial charge in the aqueous dispersion of solids. It is, however, also possible to include only some of said dispersants in the initial charge in the aqueous dispersion of solids and to add the remainders continuously or discontinuously during the free-radical emulsion polymerization. It is, however, essential to the invention that, before and during the free-radically initiated emulsion polymerization, the abovementioned equivalent ratio of anionic and cationic dispersant as a function of the electrophoretic sign of the finely divided solid is maintained. When, therefore, inorganic solid particles are used which under the aforementioned pH conditions have an electrophoretic mobility having a negative sign, the equivalent ratio of anionic to cationic dispersant must be greater than 1 throughout the emulsion polymerization. Similarly, in the case of inorganic solids particles having an electrophoretic mobility having a positive sign, the equivalent ratio of cationic to anionic dispersant must be greater than 1 throughout the emulsion polymerization. It is advantageous if the equivalent ratio is $\geq 2$, $\geq 3$, $\geq 4$, $\geq 5$, $\geq 6$, $\geq 7$, or $\geq 10$, an equivalent ratio in the range between 2 and 5 being particularly advantageous.

It is of advantage if some or all of said at least one nonionic dispersant is added before said at least one anionic and cationic dispersant is added.

The conduct of a free-radically initiated aqueous emulsion polymerization of ethylenically -unsaturated monomers is described in many instances in the prior art and is therefore sufficiently well known to the skilled worker (cf., e.g., Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, 2nd Edition, Vol. 1, pages 33 to 415, Chapman & Hall, 1997; H. Warson, The Applications of Synthetic Resin Emulsions, pages. 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969, and patent DE-A 40 03 422].

It is usually carried out by dispersely distributing said ethylenically unsaturated monomers in the aqueous medium, with the use of dispersants, and polymerizing the monomers using at least one free-radical polymerization initiator. The process of the invention differs from this procedure only in the additional presence of at least one finely divided inorganic solid which has a nonzero electrophoretic mobility and in the use of a special dispersant combination.

Monomers suitable as said at least one ethylenically unsaturated monomer for the process of the invention include, in particular, monomers which are easy to polymerize free-radically, such as, for example, ethylene, vinylaromatic monomers, such as styrene, α-methylstyrene, o-chlorostyrene or vinyltoluenes, esters of vinyl alcohol and $C_1$–$C_{18}$ monocarboxylic acids, such as vinyl acetate, vinyl propionate, vinyl n-butyrate, vinyl laurate and vinyl stearate, esters of preferably $C_3$–$C_6$ α,β-monoethylenically unsaturated mono- and dicarboxylic acids, such as especially acrylic acid, methacrylic acid, maleic acid, fumaric acid and itaconic acid, with generally $C_1$–$C_{12}$, preferably $C_1$–$C_8$ and, in particular, $C_1$–$C_4$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers, which, based on the overall amount of the monomers to be polymerized by the process of the invention, normally account for a proportion of $\geq 50\%$, $\geq 80\%$ or $\geq 90\%$ by weight. As a general rule, these monomers are only of moderate to poor solubility in water under standard conditions [20° C., 1 bar (absolute)].

Monomers which customarily increase the internal strength of the films of the polymer matrix normally contain at least one epoxy, hydroxyl, N-methylol or carbonyl group or at least two nonconjugated ethylenically unsaturated double bonds. Examples thereof are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are the methacrylic and acrylic $C_1$–$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the abovementioned monomers are copolymerized in amounts of up to 5% by weight, based on the total amount of the monomers to be polymerized.

Optionally, it is also possible to use monomers containing siloxane groups, such as the vinyltrialkoxysilanes, e.g., vinyltrimethoxysilane, alkylvinyldialkoxysilanes, acryloyloxyalkyltrialkoxysilanes, or methacryloyloxyalkyltrialkoxysilanes, such as acryloyloxyethyltrimethoxysilane, methacryloyloxyethyltrimethoxysilane, acryloyloxypropyltrimethoxysilane or methacryloyloxypropyltrimethoxysilane, for example. These monomers are used in amounts of up to 2% by weight, frequently from 0.01 to 1% by weight, and often from 0.05 to 0.5% by weight, based in each case on the total monomer amount.

Besides these, it is possible additionally to use as monomers those ethylenically unsaturated monomers A which contain either at least one acid group and/or its corresponding anion or those ethylenically unsaturated monomers B which contain at least one amino, amido, ureido or N-heterocyclic group and/or the N-protonated or N-alkylated ammonium derivatives thereof. Based on the total monomer amount, the amount of monomers A or monomers B, respectively, is up to 10% by weight, often from 0.1 to 7% by weight, and frequently from 0.2 to 5% by weight.

Monomers A used are ethylenically unsaturated monomers containing at least one acid group. The acid group may, for example, be a carboxylic, sulfonic, sulfuric, phosphoric and/or phosphonic acid group. Examples of monomers A are acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also phosphoric monoesters of n-hydroxyalkyl acrylates and n-hydroxyalkyl methacrylates, such as phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate, for example. In accordance with the invention, however, it is also possible to use the ammonium and alkali metal salts of the aforementioned ethylenically unsaturated monomers containing at least one acid group. Particularly preferred alkali metals are sodium and potassium. Examples of such compounds are the ammonium, sodium, and potassium salts of acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also the mono- and di-ammonium, -sodium and -potassium salts of the phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate.

Preference is given to using acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid.

As monomer B, use is made of ethylenically unsaturated monomers which contain at least one amino, amido, ureido or N-heterocyclic group and/or the N-protonated or N-alkylated ammonium derivatives thereof.

Examples of monomers B which contain at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methylamino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-(N-isopropylamino)ethyl acrylate, 2-(N-isopropylamino)ethyl methacrylate, 2-(N-tert-butylamino)ethyl acrylate, 2-(N-tert-butylamino)ethyl methacrylate (available commercially, for example, as Norsocryl® TBAEMA from Elf Atochem), 2-(N,N-dimethylamino)ethyl acrylate (available commercially, for example, as Norsocryl® ADAME from Elf Atochem), 2-(N,N-dimethylamino)ethyl methacrylate (available commercially, for example, as Norsocryl® MADAME from Elf Atochem), 2-(N,N-diethylamino)ethyl acrylate, 2-(N,N-diethylamino) ethyl methacrylate, 2-(N,N-di-n-propylamino)ethyl acrylate, 2-(N,N-di-n-propylamino) ethyl methacrylate, 2-(N,N-diisopropylamino)ethyl acrylate, 2-(N,N-diisopropylamino)ethyl methacrylate, 3-(N-methylamino)propyl acrylate, 3-(N-methylamino)propyl methacrylate, 3-(N-ethylamino)propyl acrylate, 3-(N-ethylamino)propyl methacrylate, 3-(N-n-propylamino)propyl acrylate, 3-(N-n-propylamino)propyl methacrylate, 3-(N-isopropylamino)propyl acrylate, 3-(N-isopropylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-diisopropylamino)propyl acrylate and 3-(N,N-diisopropylamino)propyl methacrylate.

Examples of monomers B which contain at least one amido group are acrylamide, methacrylamide, N-methylacrylamide, N-methylmethacrylamide, N-ethylacrylamide, N-ethylmethacrylamide, N-n-propylacrylamide, N-n-propylmethacrylamide, N-isopropylacrylamide, N-isopropylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-diisopropylacrylamide, N,N-diisopropylmethacrylamide, N,N-di-n-butylacrylamide, N,N-di-n-butylmethacrylamide, N-(3-N',N'-dimethylaminopropyl)methacrylamide, diacetoneacrylamide, N,N'-methylenebisacrylamide, N-(diphenylmethyl)acrylamide, N-cyclohexylacrylamide, and also N-vinylpyrrolidone and N-vinylcaprolactam.

Examples of monomers B which contain at least one ureido group are N,N'-divinylethyleneurea and 2-(1-imidazolin-2-onyl)ethyl methacrylate (available commercially, for example, as Norsocryl® 100 from Elf Atochem).

Examples of monomers B which contain at least one N-heterocyclic group are 2-vinylpyridine, 4-vinylpyridine, 1-vinylimidazole, 2-vinylimidazole, and N-vinylcarbazole.

Preference is given to using the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide, and 2-(1-imidazolin-2-onyl)ethyl methacrylate.

Depending on the pH of the aqueous reaction medium, it is also possible for some or all of the aforementioned nitrogen-containing monomers B to be present in the N-protonated quaternary ammonium form.

Examples that may be mentioned of monomers B which have a quaternary alkylammonium structure on the nitrogen include 2-(N,N,N-trimethylammonium)ethyl acrylate chloride (available commercially, for example, as Norsocryl® ADAMQUAT MC 80 from Elf Atochem), 2-(N,N,N-trimethylammonium)ethyl methacrylate chloride (available commercially, for example, as Norsocryl® MADQUAT MC 75 from Elf Atochem), 2-(N-methyl-N,N-diethylammonium)ethyl acrylate chloride, 2-(N-methyl-N,N-diethylammonium)ethyl methacrylate chloride, 2-(N-methyl-N,N-dipropylammonium)ethyl acrylate chloride, 2-(N-methyl-N,N-dipropylammonium)ethyl methacrylate, 2-(N-benzyl-N,N-dimethylammonium)ethyl acrylate chloride (available commercially, for example, as Norsocryl® ADAMQUAT BZ 80 from Elf Atochem), 2-(N-benzyl-N,N-dimethylammonium)ethyl methacrylate chloride (available commercially, for example, as Norsocryl® MADQUAT BZ 75 from Elf Atochem), 2-(N-benzyl-N,N-diethylammonium)ethyl acrylate chloride, 2-(N-benzyl-N,N-diethylammonium)ethyl methacrylate chloride, 2-(N-benzyl-N,N-dipropylammonium)ethyl acrylate chloride, 2-(N-benzyl-N,N-dipropylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium)propyl acrylate chloride, 3-(N-methyl-N,N-diethylammonium)propyl methacrylate chloride, 3-(N-methyl-N,N-dipropylammonium)propyl acrylate chloride, 3-(N-methyl-N,N-dipropylammonium) propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethylammonium)propyl methacrylate chloride, 3-(N-benzyl-N,N-dipropylammonium)propyl acrylate chloride, and 3-(N-benzyl-N,N-dipropylammonium)propyl methacrylate chloride. It is of course also possible to use the corresponding bromides and sulfates instead of chlorides named.

Preference is given to using 2-(N,N,N-trimethylammonium)ethyl acrylate chloride, 2-(N,N,N-trimethylammonium)ethyl methacrylate chloride, 2-(N-benzyl-N,N-dimethylammonium)ethyl acrylate chloride, and 2-(N-benzyl-N,N-dimethylammonium)ethyl methacrylate chloride.

As at least one ethylenically unsaturated monomer it is of course also possible to use mixtures of the aforementioned ethylenically unsaturated monomers.

It is important that, where dispersed solids particles having an electrophoretic mobility having a negative sign are present, some or all of the at least one anionic dispersant may be replaced by the equivalent amount of at least one monomer A and, where dispersed solids particles having an electrophoretic mobility having a positive sign are present, some or all of the at least one cationic dispersant may be replaced by the equivalent amount of at least one monomer B.

Initiators suitable for use as said at least one free-radical polymerization initiator for the free-radical aqueous emulsion polymerization of the invention are all those capable of triggering a free-radical aqueous emulsion polymerization in the presence of said at least one finely divided inorganic solid. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, or else organic peroxides, such as alkyl hydroperoxides, examples being tert-butyl, p-menthyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis(2,4-dimethylvaleronitrile) and 2,21'-azobis(amidinopropyl) dihydrochloride (AIBA, corresponding to the commercial product V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium hydrogen sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts, of aliphatic sulfinic acids, and alkali metal hydrogen sulfides, e.g., potassium and/or sodium hydrogen sulfide, salts of polyvalent metals, such as iron(II) sulfate, iron(II)/ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical polymerization initiator used, based on the total amount of the monomer mixture, is from 0.1 to 5% by weight.

In accordance with the invention, all of said at least one free-radical polymerization initiator can be introduced, together with said at least one finely divided inorganic solid, as an initial charge in the reaction medium. An alternative option is to include, if appropriate, only some of said at least one free-radical polymerization initiator in the initial charge, in the aqueous dispersion of solids, and then to add, continuously or discontinuously, the total amount, or the remainder if appropriate, during the free-radical emulsion polymerization of the invention at the rate at which it is consumed.

It is essential for the process of the invention that the aforementioned dispersants are added first to the aqueous dispersion of solids particles, followed by from 0.01 to 30% by weight, often from 0.5 to 20% by weight, and frequently from 1 to 10% by weight, of the total amount of said at least one monomer, added discontinuously in one portion, and that said monomer is polymerized up to a conversion of at least 90%, preferably $\geq$95%. Thereafter, the remainder of the at least one ethylenically unsaturated monomer is added continuously or discontinuously under polymerization conditions at the rate at which it is consumed. The monomers may be added as they are or else in the form an aqueous monomer emulsion.

Suitable reaction temperatures for the free-radical aqueous emulsion polymerization of the invention in the presence of said at least one finely divided inorganic solid embrace the entire range from 0 to 170° C. In general, the temperatures used are from 50 to 120° C., frequently from 60 to 110° C. and often $\geq$70 to 100° C. The free-radical aqueous emulsion polymerization of the invention can be conducted at a pressure less than, equal to or greater than 1 bar (absolute), so that the polymerization temperature may exceed 100° C. and can be up to 170° C. Highly volatile monomers such as ethylene, butadiene or vinyl chloride are preferably polymerized under increased pressure. In this case the pressure can adopt values of 1.2, 1.5, 2, 5, 10 or 15 bar or higher. When emulsion polymerizations are conducted under subatmospheric pressure, pressures of 950 mbar, frequently 900 mbar and often 850 mbar (absolute) are established. The free-radical aqueous emulsion polymerization of the invention is advantageously conducted at 1 bar (absolute) under an inert gas atmosphere, such as under nitrogen or argon, for example.

The aqueous reaction medium may in principle also include water-soluble organic solvents, such as methanol, ethanol, isopropanol, butanols, pentanols, and also acetone, etc., for example. Preferably, however, the process of the invention is conducted in the absence of such solvents.

Besides the abovementioned components, it is also possible, optionally, in the process of the invention to use free-radical chain transfer compounds in order to reduce or control the molecular weight of the polymers obtainable by the polymerization. Suitable compounds of this type include, essentially, aliphatic and/or araliphatic halogen compounds, such as n-butyl chloride, n-butyl bromide, n-butyl iodide, methylene chloride, ethylene dichloride, chloroform, bromoform, bromotrichloromethane,. dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in Polymer Handbook, $3^{rd}$ Edition, 1989, J. Brandrup and E. H. Immergut, John Wiley & Sons, Section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane, or vinylcyclohexane or hydrocarbons having readily abstractable hydrogen atoms, such as toluene, for example. It is, however, also possible to use mixtures of mutually compatible, abovementioned free-radical chain transfer compounds.

The total amount of the free-radical chain transfer compounds used optionally in the process of the invention, based on the total amount of the monomers to be polymerized, is generally ≦5% by weight, often ≦3% by weight, and frequently ≦1% by weight.

It is advantageous if all or some of the free-radical chain transfer compound used optionally is added to the reaction medium before the free-radical polymerization is initiated. Furthermore, some or all of the free-radical chain transfer compound may advantageously also be supplied to the reaction medium together with said at least one ethylenically unsaturated monomer during the polymerization.

The process of the invention can be carried out, for example, by introducing a stable aqueous dispersion of said at least one finely divided inorganic solid, containing either some or all of the required water, of the at least one anionic, cationic and nonionic dispersant, of the at least one polymerization initiator and from 0.01 to 30% by weight of the total of the at least one ethylenically unsaturated monomer, and of any further customary auxiliaries and additives, into a reaction vessel, and heating the contents of the reaction vessel to reaction temperature. At this temperature, after polymerizing the at least one ethylenically unsaturated monomer to a conversion of at least 90%, any remaining amounts of the water, of the at least one anionic, cationic and nonionic dispersant, of the at least one ethylenically unsaturated monomer, and of any further customary auxiliaries and additives, are added continuously or discontinuously, after which the reaction mixture is held further at reaction temperature if desired.

The aqueous dispersions of composite particles that are obtainable in accordance with the invention normally have a solids content of from 1 to 70% by weight, frequently from 5 to 65% by weight, and often from 10 to 60% by weight.

The composite particles obtainable in accordance with the invention generally possess particle diameters of ≦1000 nm, frequently ≦500 nm and often ≦250 nm. These particle diameters are also determined by the AUC method. The values stated are those known as $d_{50}$ values.

The composite particles obtainable by the process of the invention can have different structures. The composite particles of the invention can comprise one or more of the finely divided solid particles. The finely divided solid particles may be completely enveloped by the polymer matrix. Alternatively, it is possible for some of the finely divided solid particles to be enveloped by the polymer matrix while others are arranged on the surface of the polymer matrix. It is of course also possible for a majority of the finely divided solid particles to be bound on the surface of the polymer matrix. It should be noted that in certain cases, depending on the solids concentration of the dispersed composite particles, there may also be minor partial agglomeration of the composite particles.

The monomer residues remaining in the aqueous dispersion of the composite particles after the end of the main polymerization reaction can of course be removed by steam stripping and/or inert gas stripping and/or by chemical deodorization, as described, for example, in the documents DE-A 4 419 518, EP-A 767 180 and DE-A 3 834 734, without adversely altering the properties of the aqueous dispersion of composite particles.

From the aqueous dispersions of composite particles that are obtainable by way of the process of the invention it is readily possible to prepare polymer films comprising inorganic particulate solids. As compared with the polymer films containing no inorganic particulate solids, these polymer films are generally of increased mechanical strength with reduced blushing, better adhesion to mineral surfaces, improved resistance toward organic solvents, and increased scratch resistance, blocking resistance, and thermal stability. A lower polymer film sensitivity toward organic solvents and water is exhibited in particular by films of aqueous composite-particle dispersions in whose polymers monomers containing siloxane groups have been copolymerized.

Aqueous dispersions of composite particles prepared by the process of the invention described are suitable as raw materials for preparing adhesives, such as pressure-sensitive adhesives, building adhesives or industrial adhesives, for example, binders, such as for paper coating, for example, emulsion paints, or for printing inks and print varnishes for printing plastics films, for producing nonwovens, and for producing protective coats and water vapor barriers, such as in priming, for example. In addition, the dispersions of composite particles obtainable by the process of the invention can be used to modify cement formulations and mortar formulations. The composite particles obtainable by the process of the invention can also be used, in principle, in medical diagnostics and in other medical applications (cf., e.g., K. Mosbach and L. Andersson, Nature 270 (1977) 259 to 261; P. L. Kronick, Science 200 (1978) 1074 to 1076; and U.S. Pat. No. 4,157,323). Furthermore, the composite particles can also be used as catalysts in various aqueous dispersion systems.

It should also be noted that the aqueous dispersions of composite particles, obtainable in accordance with the invention, can be dried in a simple manner to give redispersible composite-particle powders (e.g., by freeze or spray drying). This is so in particular when the glass transition temperature of the polymer matrix of the composite particles obtainable in accordance with the invention is ≧50° C., preferably ≧60° C., with particular preference ≧70° C., with very particular preference ≧80° C., and, with special preference, ≧90° C. or ≧100° C. The composite-particle powders are suitable, inter alia, as plastics additives, components for toner formulations or additives in electrophotographic applications, and as components of cement and mortar formulations.

EXAMPLES

The finely divided inorganic solid used for the examples below was silicon dioxide. Used as a representative example was the commercially available silicon dioxide sol Nyacol® 2040 (20 nm) from Akzo-Nobel. The $SiO_2$ content of the aqueous solid-particle dispersion was 40% by weight, its pH 10. The values indicated in round brackets correspond to the diameter of the respective inorganic solid particles according to the manufacturer's indications.

The solids dispersion used in the examples met all of the requirements made of it, namely that one hour after its preparation, without stirring or shaking, at an initial solids concentration of ≧1% by weight, based on the aqueous dispersion of the solid, it contained more than 90% by weight of the originally dispersed solid in dispersed form; the dispersed particulate solids have a diameter ≦100 nm; and, moreover, the dispersed inorganic particulate solids exhibited a nonzero electrophoretic mobility in an aqueous standard potassium chloride solution at a pH which corresponds to the pH of the aqueous dispersion medium before the beginning of dispersant addition.

1st Example

A 2 l four-necked flask equipped with a reflux condenser, a thermometer, a mechanical stirrer and a metering device was charged under nitrogen atmosphere at from 20 to 25° C.

(room temperature) and 1 bar (absolute) and with stirring (200 revolutions per minute) with 416.6 g of Nyacol® 2040 and then with a mixture of 2.5 g of methacrylic acid and 12 g of a 10% strength by weight aqueous solution of sodium hydroxide, added over the course of 5 minutes. Thereafter, 10.4 g of a 20% strength by weight aqueous solution of the nonionic surfactant Lutensole® AT18 (brand name of BASF AG, $C_{16}C_{18}$ fatty alcohol ethoxylate having 18 ethylene oxide units) were added over the course of 15 minutes to the stirred reaction mixture. Thereafter, 0.83 g of N-cetyl-N,N, N-trimethylammonium bromide (CTAB) in solution in 200 g of deionized water was metered in to the reaction mixture over 60 minutes. The reaction mixture was then heated to a reaction temperature of 76° C.

Prepared in parallel were feed stream 1, a monomer mixture consisting of 123.5 g of methyl methacrylate (MMA), 126 g of n-butyl acrylate (n-BA) and 0.5 g of methacryloyloxypropyltrimethoxysilane (MEMO), and feed stream 2, an initiator solution consisting of 3.8 g of sodium peroxodisulfate, 11.5 g of a 10% strength by weight solution of sodium hydroxide, and 100 g of deionized water.

Subsequently, 21.1 g of feed stream 1 and 57.1 g of feed stream 2 were added to the reaction mixture, stirred at reaction temperature, from two separate feed lines over 5 minutes. The reaction mixture was then stirred at reaction temperature for one hour. Thereafter, 0.92 g of a 45% strength by weight aqueous solution of Dowfax® 2A1 was added to the reaction mixture and the reaction temperature was raised to 80° C. The remainders of feed streams 1 and 2 were then metered continuously into the reaction mixture over the course of 2 hours, beginning simultaneously. Thereafter, the reaction mixture was stirred at reaction temperature for one hour more and then cooled to room temperature.

The translucent aqueous composite-particle dispersion thus obtained had a solids content of 40.1% by weight, based on the total weight of the aqueous composite-particle dispersion.

The solids content was generally determined by drying about 1 g of the composite-particle dispersion to constant weight in an open aluminum crucible having an internal diameter of approximately 3 cm in a drying oven at 150° C. To determine the solids content, two separate measurements were conducted in each case and the corresponding average value was formed.

The $d_{50}$ particle diameter was determined as being 65 nm using an analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). Using the analytical centrifuge it was also possible to detect that the resulting composite particles had a homogeneous density of 1.33 $g/cm^3$. Free silicon dioxide particles were not detected.

Determining the sign of the electrophoretic mobility was carried out on the finely divided inorganic solid used using the Zetasizer 3000 from Malvern Instruments Ltd., UK. For this purpose, the dispersion of finely divided inorganic solids was diluted with pH-neutral 10 mM potassium chloride solution (standard potassium chloride solution) until its solid-particle concentration was 60 mg per liter. The pH of 10 is set using dilute sodium hydroxide solution. The electrophoretic mobility of the silicon dioxide particles in Nyacol® 2040 had a negative sign.

2nd Example

A 500 ml four-necked flask equipped with a reflux condenser, a thermometer, a mechanical stirrer and a metering device was charged under nitrogen atmosphere at room temperature and 1 bar (absolute) and with stirring (300 revolutions per minute) with 100 g of Nyacol® 2040 and then 2.5 g of a 20% strength by weight aqueous solution of Lutensol® AT18 were added. After 5 minutes 0.2 g of CTAB in solution in 30 g of deionized water was metered in to the stirred reaction mixture over 30 minutes. Then an aqueous solution consisting of 1.88 g of a 45% strength by weight aqueous solution of Dowfax® 2A1 and 11.7 g of deionized water was added to the reaction mixture.

Prepared in parallel were feed stream 1, a monomer mixture consisting of 29.95 g of MMA, 29.95 g of n-BA and 0.10 g of MEMO, and feed stream 2, an initiator solution consisting of 0.9 g of sodium peroxodisulfate, 2 g of a 1-molar aqueous solution of sodium hydroxide, and 45 g of deionized water.

Subsequently, 5 g of feed stream 1 and 25 g of feed stream 2 were added to the reaction mixture, stirred at room temperature, from two separate feed lines over 5 minutes. The reaction mixture was then heated to 76° C. and stirred at that temperature for one hour. The remainders of feed streams 1 and 2 were then metered continuously into the reaction mixture over the course of 2 hours, beginning simultaneously. Thereafter the reaction mixture was stirred at reaction temperature for one hour more and then cooled to room temperature.

The translucent aqueous composite-particle dispersion thus obtained had a solids content of 39.8% by weight, based on the total weight of the aqueous composite-particle dispersion.

The $d_{50}$ particle diameter as determined using an analytical ultracentrifuge was 100 nm. Free silicon dioxide particles were not detected.

1st Comparative Example

Example 2 was repeated except that no Dowfax® 2A1 was used.

As a result of coagulation during the polymerization reaction, a stable aqueous composite-particle dispersion was not obtained.

2nd Comparative Example

Example 2 was repeated except that there was no prepolymerization and that the total amount of feed streams 1 and 2 was metered into the reaction mixture over the course of 2 hours.

The particle dispersion formed, which had a milky cloudiness, possessed a solids content of 39.8% by weight, based on the total weight of the aqueous particle dispersion. The particle dispersion obtained, however, was unstable and gelled within 12 hours.

3rd Example

A 500 ml four-necked flask equipped with a reflux condenser, a thermometer, a mechanical stirrer and a metering device was charged under nitrogen atmosphere at room temperature and 1 bar (absolute) and with stirring (300 revolutions per minute) with 100 g of Nyacol® 2040 and then 2.5 g of a 20% strength by weight aqueous solution of Lutensol® AT18 were added. After 5 minutes, first an aqueous solution consisting of 0.6 g of methacrylic acid, 7 g of a 1-molar aqueous solution of sodium hydroxide and 5 g of deionized water, and then, over 30 minutes, 0.2 g CTAB in solution in 30 g of deionized water were added to the stirred reaction mixture.

Prepared in parallel were feed stream 1, a monomer mixture consisting of 30 g of MMA and 30 g of n-BA, and feed stream 2, an initiator solution consisting of 0.9 g of sodium peroxodisulfate, 2 g of a 1-molar solution of sodium hydroxide, and 45 g of deionized water.

Subsequently, 5 g of feed stream 1 and 25 g of feed stream 2 were added to the reaction mixture, stirred at room temperature, from two separate feed lines over 5 minutes. The room mixture was then heated to 76° C. and stirred at that temperature for one hour. The remainders of feed streams 1 and 2 were then metered continuously into the reaction mixture over the course of 2 hours, beginning simultaneously. Thereafter the reaction mixture was stirred at reaction temperature for one hour more and then cooled to room temperature.

The translucent aqueous composite-particle dispersion thus obtained had a solids content of 39.7% by weight, based on the total weight of the aqueous composite-particle dispersion.

The $d_{50}$ particle diameter as determined using an analytical ultracentrifuge was 77 nm. Free silicon dioxide particles were not detected.

We claim:

1. A process for preparing an aqueous dispersion of particles, said particles comprising at least one addition polymer and at least one finely divided inorganic solid, said process comprising
   dispersing at least one ethylenically unsaturated monomer in an aqueous medium and
   polymerizing the monomer by free-radical aqueous emulsion polymerization with at least one free-radical polymerization initiator in the presence of at least one dispersely distributed, finely divided inorganic solid and at least one of each of an anionic, cationic and nonionic dispersant, wherein
   a) the at least one finely divided inorganic solid is present as a stable aqueous dispersion that when prepared at an original solids concentration of $\geq 1\%$ by weight, based on the aqueous dispersion of said at least one finely divided inorganic solid, the dispersion contains in dispersed form one hour after preparation more than 90% by weight of the originally dispersed finely divided inorganic solid and the dispersed finely divided inorganic solid particles have a diameter $\leq 100$ nm, and
   b) the dispersed particles of said at least one inorganic solid exhibit a nonzero electrophoretic mobility in an aqueous standard potassium chloride solution at a pH which corresponds to the pH of the aqueous reaction medium before the addition of the anionic, cationic or nonionic dispersants,
   said process further comprising
   c) adding at least one of each of an anionic, cationic and nonionic dispersant to the aqueous dispersion of the finely divided inorganic solid before beginning dispersing said at least one ethylenically unsaturated monomer therein,
   d) then adding from 0.01 to 30% by weight of the total amount of said at least one monomer to the aqueous dispersion and polymerizing to a conversion of at least 90%, and
   e) thereafter adding the remainder of said at least one monomer under polymerization conditions at the rate at which it is consumed.

2. The process as claimed in claim 1, wherein from 1 to 1000 parts by weight of said at least one finely divided inorganic solid are present per 100 parts by weight of said at least one ethylenically unsaturated monomer, said process further comprising
   a) adding from 0.01 to 10 parts by weight of at least one cationic dispersant, from 0.01 to 100 parts by weight of at least one nonionic dispersant, and at least one anionic dispersant in an equivalent ratio of anionic to cationic dispersant of more than 1 when the dispersed solid particles have an electrophoretic mobility having a negative sign, or
   b) adding from 0.01 to 10 parts by weight of at least one anionic dispersant, from 0.01 to 100 parts by weight of at least one nonionic dispersant, and at least one cationic dispersant in an equivalent ratio of cationic to anionic dispersant of more than 1 when the dispersed solid particles have an electrophoretic mobility having a positive sign.

3. The process as claimed in claim 2, wherein
   a) in the presence of dispersed solid particles having an electrophoretic mobility having a negative sign, some or all of said at least one anionic dispersant is replaced by the equivalent amount of at least one monomer A containing at least one acid group and/or its corresponding anion, and
   b) in the presence of dispersed solid particles having an electrophoretic mobility having a positive sign, some or all of said at least one cationic dispersant is replaced by the equivalent amount of at least one monomer B containing at least one amino, amido, ureido or N-heterocyclic group and/or the N-protonated or N-alkylated ammonium derivatives thereof.

4. The process as claimed in claim 1, wherein said at least one nonionic dispersant is added before said at least one cationic and anionic dispersant.

5. The process as claimed in claim 1, wherein said at least one inorganic solid is selected from the group consisting of silicon dioxide, aluminum oxide, hydroxyaluminum oxide, calcium carbonate, magnesium carbonate, calcium orthophosphate, magnesium orthophosphate, iron(II) oxide, iron(III) oxide, iron(II/III) oxide, tin(IV) oxide, cerium(IV) oxide, yttrium(III) oxide, titanium dioxide, hydroxyapatite, zinc oxide, and zinc sulfide.

6. The process as claimed in claim 1, wherein said at least one inorganic solid is a silicon dioxide sol which has an electrophoretic mobility having a negative sign.

7. The process as claimed in claim 1, wherein the total amount of said at least one monomer added to the aqueous dispersion ranges from 0.5 to 20% by weight.

8. The process as claimed in claim 7, wherein the total amount of said at least one monomer ranges from 1 to 10% by weight.

9. The process as claimed in claim 1, wherein the finely dispersed inorganic solid particles have a diameter of >0 nm to $\leq 90$ nm.

10. The process as claimed in claim 9, wherein the finely dispersed inorganic solid particles have a diameter of >0 nm to $\leq 80$ nm.

11. The process as claimed in claim 1, wherein the initial concentration of finely divided inorganic solids is $\leq 60\%$ by weight.

12. The process as claimed in claim 11, wherein the initial concentration of finely divided inorganic solids is ≦55% by weight.

13. The process as claimed in claim 2, wherein, when the dispersed solid particles have an electrophoretic mobility having a negative sign, the amount of said at least one cationic dispersant added ranges from 0.05 to 5 parts by weight, and the amount of said at least one nonionic dispersant ranges from 0.05 to 50 parts by weight, and when the dispersed solid particles have an electrophoretic mobility having a positive sign, the amount of said at least one anionic dispersant added ranges from 0.05 to 5 parts by weight, and the amount of said at least one nonionic dispersant ranges from 0.05 to 50 parts by weight.

14. The process as claimed in claim 13, wherein, when the dispersed solid particles have an electrophoretic mobility having a negative sign, the amount of said at least one cationic dispersant added ranges from 0.1 to 3 parts by weight, and the amount of said at least one nonionic dispersant ranges from 0.1 to 20 parts by weight, and when the dispersed solid particles have an electrophoretic mobility having a positive sign, the amount of said at least one anionic dispersant added ranges from 0.1 to 3 parts by weight, and the amount of said at least one nonionic dispersant ranges from 0.1 to 20 parts by weight.

15. An aqueous dispersion of composite particles obtained by the process as claimed in claim 1.

16. A composite-particle powder obtained by drying the aqueous dispersion of composite particles, as claimed in claim 15.

17. A method comprising
applying a composition comprising the aqueous dispersion of composite particles as claimed in claim 15 on a substrate to form a protective coat or an adhesive.

* * * * *